June 30, 1959 W. A. OGLETREE 2,892,940

VOLTAGE COMPARATOR

Filed April 4, 1955 2 Sheets-Sheet 1

*INVENTOR.*
WILLIAM A. OGLETREE

*BY* Charles F. Carroll, Jr.

ATTORNEY

June 30, 1959 W. A. OGLETREE 2,892,940

VOLTAGE COMPARATOR

Filed April 4, 1955 2 Sheets-Sheet 2

*INVENTOR.*
WILLIAM A. OGLETREE

*BY* Charles F. Carroll, Jr.

ATTORNEY

United States Patent Office 2,892,940

Patented June 30, 1959

2,892,940

VOLTAGE COMPARATOR

William A. Ogletree, Southampton, Pa., assignor to Burroughs Corporation, Detroit, Mich., a corporation of Michigan Application April 4, 1955, Serial No. 498,919

5 Claims. (Cl. 250—27)

This invention is concerned with equipment for comparing voltages to determine relative magnitude, and is particularly concerned with voltage comparators used in equipment which converts an analog signal into its digital equivalent and with voltage comparators used for balance-sensing in control equipment.

An equipment used to convert an analog signal into its digital equivalent has been given the name of quantizer. An important class of quantizer is the type that converts an analog signal which is a continuously-variable voltage into a digital signal which is a binary signal, i.e., it has only two amplitude levels. These can be "zero" and "one" or "plus one" and "minus one." Each has its particular applications.

Such quantizers comprise two circuits, a generator of reference voltage and a comparator to indicate when the analog voltage exceeds the reference voltage. Earlier types of comparators are described in volume 19 of the MIT Radiation Laboratory Series, published by McGraw-Hill and titled "Waveforms."

Various circuits exist for generating the reference voltage at a rapid rate, but no satisfactory method and apparatus has been heretofore available for making the comparison at the same high speed, which did not entail expensive and complicated circuitry.

An object of this invention is to provide an improved voltage comparator.

A more specific object of this invention is to provide a circuit to compare an analog signal and a reference voltage and to provide a pulse or digital output when the analog voltage exceeds the reference voltage, which circuit makes this comparison at the high speeds required in computer systems.

Another object of this invention is to provide a circuit to compare a known voltage and an unknown voltage and to provide a pulse output when the voltages are not equal to indicate the direction or polarity of the inequality, and having a null or a minimum amplitude indicating equality of the voltages. This pulse output is used to operate balance-restoring and control equipment.

Other objects, features, and advantages of this invention will be found throughout the following more detailed description of the invention, particularly when considered with the accompanying drawing, in which.

Figure 1:
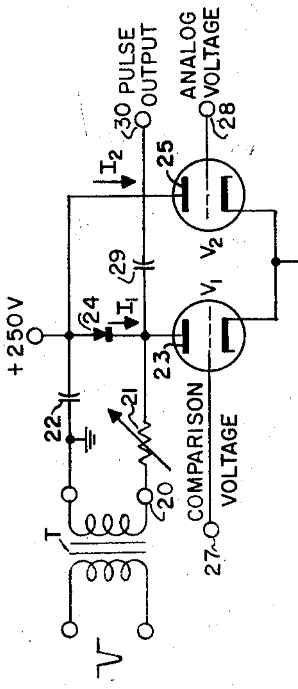
Fig. 1 is a schematic diagram of the basic comparator circuit.

The invention employs vacuum tube or transistor amplifiers and diode circuitry to attain high speed comparator capability. As shown in Fig. 1, the basic comparator is essentially a differential amplifier which operates to modulate a pulse input to produce a pulse output characteristic of the difference in voltages applied to the differential amplifier's inputs.

Basically, a differential amplifier receives two input voltages and provides an output voltage which is much more sensitive to changes in their difference than to changes in their common level. A very useful version of the differential amplifier utilizes a pair of amplifying devices such as triodes $V_1$ and $V_2$ of Fig. 1 in a balanced circuit, with both tubes connected to a common cathode-to-ground resistor 26. Cathode resistor 26 is a current responsive circuit element which uses the current of both tubes for mutual biasing and cathode-coupling of signals. With other amplifying devices such as transistors, this common resistor 26 would be connected to that element of the amplifying devices which is common to both input and output circuits thereof, usually the grounded element in ordinary amplifier circuitry. In this manner each amplifier device is coupled to the other device and balance is maintained. The output is responsive mostly to the difference between input voltages.

A detailed description of differential amplifiers is to be found on pages 441–452 of volume 18 of the Radiation Laboratory Series, titled "Vacuum Tube Amplifiers," published by McGraw-Hill Co. In particular, the circuit of Fig. 11–25 thereof is suitable for use in this invention. With two tubes in a balanced circuit, the large common cathode resistor applies a bias which keeps total current substantially constant, so variations in plate resistance are equal and opposite and linearity is improved. Circuit response is to differences in the voltages applied to the input circuits. A positive pulse input signal of about 40 volts is applied at terminal 20 of Fig. 1 and goes through variable resistor 21 to plate 23 of tube $V_1$. A non-linear impedance which conducts current in a forward direction much more readily than it conducts current in the opposite direction, such as diode 24, is connected so that current $I_1$, through tube $V_1$ holds the non-linear impedance or diode 24, in good conducting condition. For clarity, this conducting condition is referred to as a closed condition, and the opposite non-conducting condition is referred to as an open condition. The polarity of the pulse applied at plate 23 is such that diode 24 tends to go to its non-conducting or open condition. With the circuit as shown, the pulse on terminal 20 is positive after passing through coupling transformer T.

Plate 25 of vacuum tube $V_2$ connects directly to the +250 volt supply terminal. Cathodes of tubes $V_1$ and $V_2$ are connected together through a common cathode resistor 26 to the —250 volt supply terminal. Grid 27 of tube $V_1$ receives the comparison voltage, and grid 28 of tube $V_2$ receives the analog voltage. A pulse output is taken from plate 23 through blocking capacitor 29 to output terminal 30.

To operate the circuit of Fig. 1, the comparison and analog voltages on grids 27 and 28 respectively are made equal. This causes currents $I_1$ and $I_2$ through tubes $V_1$ and $V_2$, respectively, to be about equal in magnitude. Resistor 21 is then adjusted to vary the amplitude of pulses applied through transformer T to plate 23 so that current $I_1$ through tube $V_1$ is of a magnitude which just barely keeps diode 24 in its conducting condition. In this condition, diode 24 shorts the pulse and negligible pulse voltage is built up across the low forward resistance of diode 24, resulting in negligible pulse output signals at terminal 30 for pulse input signals on terminal 20.

When the comparison voltage is greater than the analog voltage from the previous condition of equality with the analog voltage, current $I_1$ increases and diode 24 continues to short out pulses applied at terminal 20. When, conversely, the comparison voltage is less than the analog voltage, then current $I_1$ decreases and the pulse current will tend to exceed $I_1$, cutting off the conduction through diode 24. When the pulse current exceeds $I_1$, the pulse current charges diode 24 and develops a voltage across the large back resistance of the diode 24, and a pulse output signal goes through capacitor 29 to output terminal 30. This occurs in part as a result of a readjustment of the voltage division between resistor 21, capacitor 22, the plate resistance of $V_1$, and diode 24, as diode 24 increases many times in resistance when changing from forward to back resistance and tube $V_1$ is biased to lower current and presents higher plate resistance. Maximum amplitude pulses at output terminal 30 occur when the analog voltage exceeds the comparison voltage in a ratio which causes enough bias in resistor 26 that tube $V_1$ is cut off. Minimum output pulses occur when the ratio of analog to comparison voltage causes tube $V_2$ to cut off current $I_2$. This cut-off relation between tubes is caused by the common cathode resistor 26 and the biasing effects of the analog and comparison voltages. The voltage range from maximum to minimum output is a very small variation of about 10 millivolts from equality of analog and comparison voltages.

When a junction diode of a crystalline material is used for the nonlinear impedance element designated as diode 24, the sensitivity of the comparator is considerably increased by the phenomenon of hole storage in the crystal lattice of the junction diode structure. When such a diode conducts current in the forward direction, there is a flow of electrons from negative to positive sides of the diode, and a flow of "holes," or places in the crystal lattice from which electrons are missing, from the positive to the negative sides of the diode. A large number of these holes remain throughout the diode's material for some time after the current which produced them is stopped. If a potential tending to cause a current to flow in the reverse non-conducting direction is applied, it must remove these holes which are stored in the diode before the diode's resistance to current flow in the non-conducting direction can be realized, i.e., to open the diode. Reference is made to my copending application S.N. 488,292, filed February 15, 1955, and assigned to the same assignee as this application.

Because of this hole storage, the amount of current required to open or unbias diode 24 is much greater than the forward direct current through it. This is readily seen by a specific example for Fig. 1. Assume that resistor 21 is adjusted to provide 1,000 ohms resistance and the positive pulse on terminal 20 is +40 volts. For little or no pulse output at terminal 30, peak pulse current around the loop of secondary winding of transformer T, resistor 21, and diode 24, will have to be about 40 milliamperes. In this manner, the 40 volt pulse appears as a 40 volt IR drop across resistor 21, and little or negligible voltage drop occurs across conducting diode 24. To keep diode 24 conducting, it would appear that current $I_1$ would have to be slightly in excess of peak pulse current, or more than 40 milliamperes. It was found that this was not the case. A current of 2 milliamperes through tube $V_1$ and diode 24 was sufficient to require a peak pulse current of 44 milliamperes to completely open or unbias the diode. Therefore, the diode provided an effective current gain of 22 times. The sensitivity of the comparator is thus improved just as though the transconductance of tube $V_1$ were multiplied by 22. Smaller voltage differences will actuate the comparator when such a non-linear impedance is used as diode 24.

With a 10 millivolt change in analog voltage an output pulse of 100 millivolts has been realized. This output may then be amplified sufficiently to drive a trigger circuit. In the circuit shown in Fig. 2, the "one" output pulse for analog voltage larger than comparison voltage is a −30 volts pulse, whereas the "zero" output for comparison voltage exceeding analog voltage was only −0.4 volt, or practically no pulse.

Figure 2:
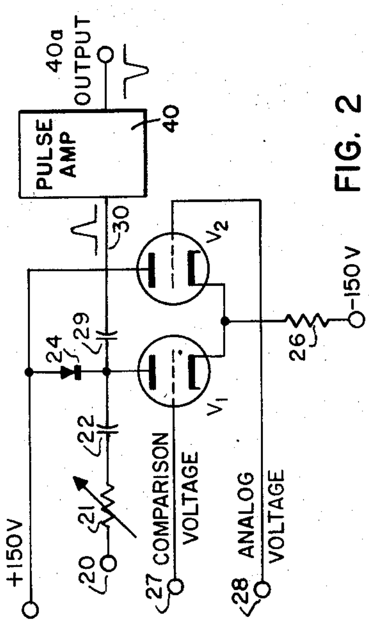
Fig. 2 is a schematic diagram of the comparator with a post-amplifier.

When post amplification is used as shown in Fig. 2, the pulses emerging from the basic comparator at terminal 30 undergo amplification and limiting in a pulse amplifier 40, so that the output at terminal 40a is either a large pulse when the comparison voltage does not exceed the analog voltage, or no pulse when the comparison voltage does exceed the analog voltage. Opposite significance of this digital output can be provided if input connections for analog and comparison voltages are interchanged.

Figure 3:
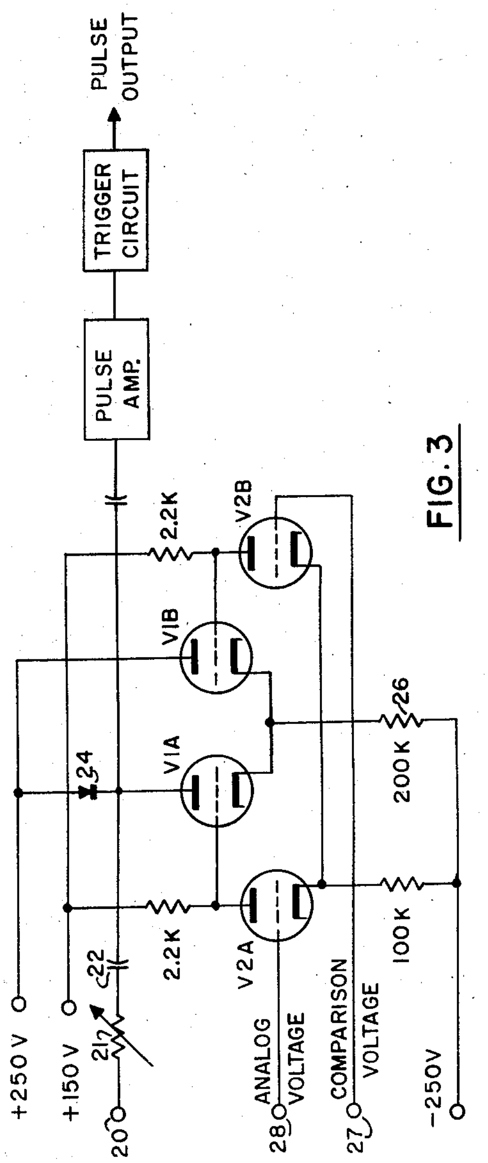
Fig. 3 is a schematic diagram of the comparator with both a post-amplifier and a pre-amplifier.

Pre-amplification also may be used, as shown in Fig. 3. When the comparator is to be used in quantizing to granularities less than one part in 500, pre-amplification is essential, otherwise the common mode signal (equal voltages on grids) produces an error in excess of one quantum value. Fig. 3 shows a differential pre-amplifier tube $V_2$ comprising the triode sections $V_{2A}$ and $V_{2B}$ connected to the comparator tube $V_1$ comprising the triode sections $V_{1A}$ and $V_{1B}$. A differential pre-amplifier is used because of its low sensitivity to common mode signals (equal voltages on both input circuits). Differences in the voltages applied to leads 27 and 28 of Fig. 3 are amplified and applied to the comparator.

This invention provides a very high speed comparator which exhibits no pulse-recurrence-frequency sensitivity over a wide range of frequencies because of its simple circuitry having negligible reactance in series with or shunting the signal circuit, and which is inherently more stable than D.-C. amplifier comparators because of its high degenerative feedback through common cathode resistors in balanced amplifiers. When a measuring and controlling instrument is required, a null-balance type comparator is needed. A null-balance type comparator senses not only a difference but the direction of the difference. For this, a push-pull output is needed.

Figure 4:
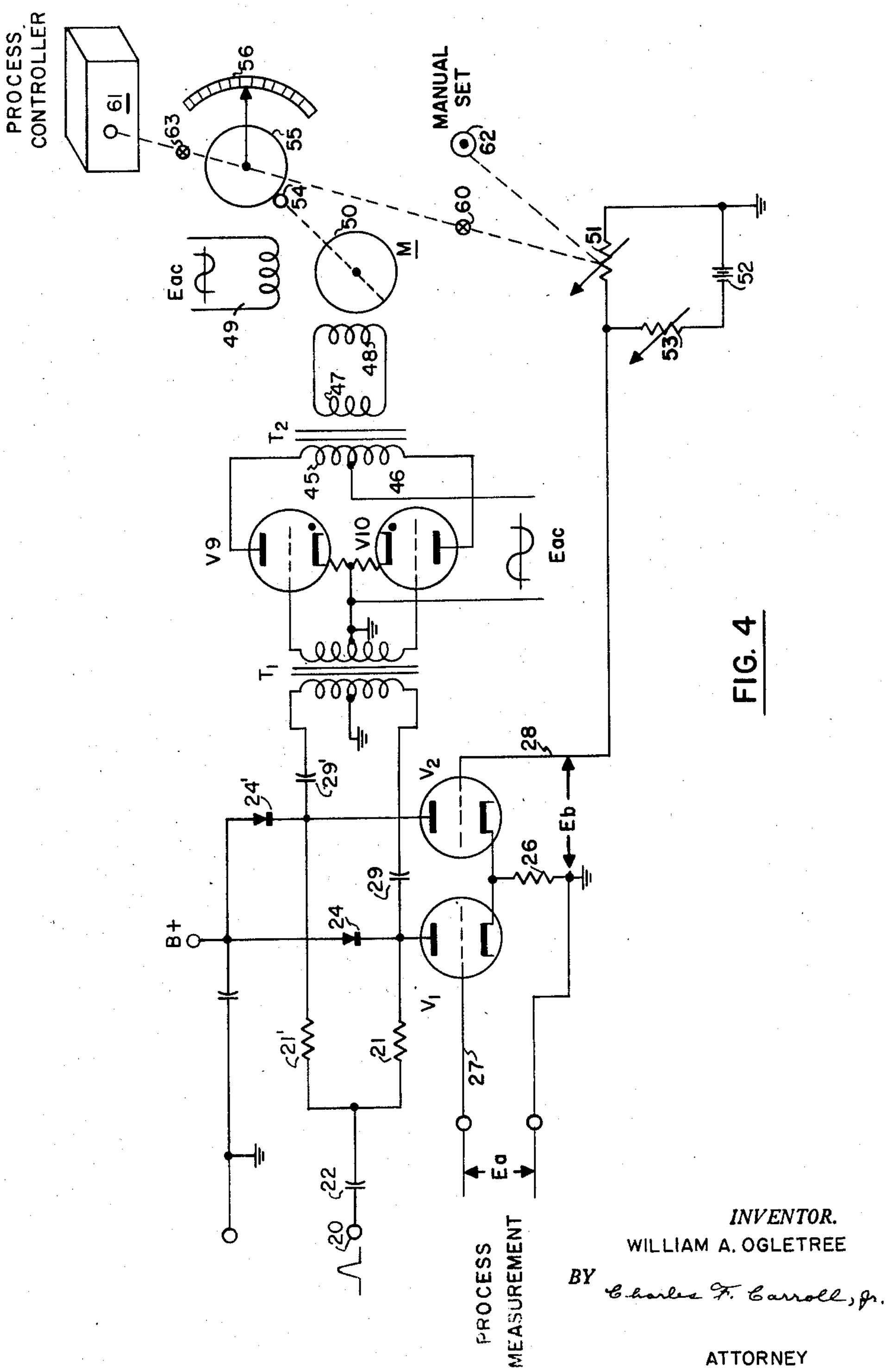
Fig. 4 is a schematic diagram of a balanced output comparator in a typical control circuit.

When balanced or push-pull output is required, rather than single-ended output, then the comparator is as shown in Fig. 4. Tubes $V_1$ and $V_2$ have diodes 24 and 24', respectively, in their plate-to-B+ circuits; and have separate resistors 21 and 21' connecting their respective plates to the pulse source. The output circuit is balanced or push-pull in nature. For a balanced output from the comparator, a balanced input transformer $T_1$ is provided in the control circuit connected to the comparator. When high system sensitivity is required, additional amplification would be required between transformer $T_1$ and the motor-controlling gas tubes $V_9$ and $V_{10}$. This would be a deviation signal amplifier.

An alternating voltage $E_{ac}$ is applied through the primary winding 45, 46 of transformer $T_2$ to the plates of tubes $V_9$ and $V_{10}$. Tubes $V_9$ and $V_{10}$ are a push-pull or balanced amplifier used as a motor controlling amplifier as will be described. Tubes $V_9$ and $V_{10}$ are shown as gas tubes, but could be high current vacuum tubes. This voltage $E_{ac}$ is synchronized with the pulse recurrence frequency and phased so the positive half-cycle of $E_{ac}$ is applied to transformer T when the pulse is applied at terminal 20. Secondary 47 of transformer $T_2$ connects to winding 48 of the 2-phase motor M. Winding 49 connects to alternate voltage $E_{ac}$. Rotor 50 will turn in either direction, depending on relative phase of currents in windings 48 and 49.

Motor M is connected through a reduction drive of wheels 54 and 55 to indicator 56 and to variable resistor 51. Resistors 51 and 53 comprise a voltage divider connected across battery 52. Variation of resistor 51 by movement of a tap on resistor 51 varies voltage $E_b$. The windings 48 and 49 on motor M are connected so that the direction of rotation of rotor 50 is made to restore equality or balance between $E_a$ and $E_b$.

It will be apparent that transformer $T_1$ could be replaced by grid-to-ground resistors of proper value, and the circuit will function satisfactorily.

To study the operation of the circuit of Fig. 4, assume that the voltage $E_b$ applied to tube $V_2$ on lead 28 exceeds voltage $E_a$ applied to tube $V_1$ on lead 27. This places tube $V_1$ at or near cut off, and diode 24 is cut off by pulse current through resistor 21. An output pulse then goes through capacitor 29 to transformer $T_1$, where it is stepped up and applied to the control grids of gas tubes $V_9$ and $V_{10}$. With the pulse output coming through capacitor 29, tube $V_{10}$ will receive a positive pulse and tube $V_9$ will receive a negative pulse, while the plates of both tubes receive a positive half-cycle of $E_{ac}$. Under these conditions, tube $V_{10}$ will fire, drawing current through winding 46 of transformer $T_2$. By induction, secondary 47 is energized and drives a current pulse through motor winding 48 in a direction characteristic of a pulse applied through capacitor 29, causing rotation of rotor M.

If voltage $E_a$ exceeds $E_b$, then an output pulse is applied through capacitor 29', tube $V_9$ fires, and an oppositely phased current is driven through winding 48. This causes rotation of rotor M in a direction opposite to its motion when $E_b$ exceeds $E_a$. In both cases, rotation varies resistor 51 to restore equality or balance between $E_a$ and $E_b$. A pulse is required to fire a tube every positive half cycle during which a voltage difference exists on input leads 27 and 28. The alternate negative half cycles quench the tube which has been fired.

When it is desired to use the system of Fig. 4 for control of a process, coupling 60 between variable-resistor 51 and driven wheel 55 is disconnected and coupling 63 between process controller 61 and wheel 55 is connected. Manual setting knob 62 is used to adjust the system to the desired control point. The nature of the process controller depends on the process and what factor of the process is used for measurement or control. For example, if the temperature of an annealing furnace had to be held at a fixed temperature, then temperature would be the measured factor and a thermocouple could provide $E_a$ at the input to the system. The process controller 61 could be a control valve on a gas furnace or a rheostat on an electric heater keeping the furnace hot. The setting of resistor 51 is such as to produce $E_b$ of a magnitude equal to what $E_a$ will be when the furnace is at the desired temperature. When $E_a$ equals $E_b$, there is no drive from motor M tending to increase the heat supply or to decrease it. If $E_a$ exceeds $E_b$, the furnace is too hot and motor M is energized in a direction moving controller 61 to reduce the heating effect. If $E_b$ exceeds $E_a$, the furnace is not hot enough and motor M drives controller 61 to increase the heating effect.

What is claimed is:

1. A voltage comparator comprising: first and second multi-electrode amplifier devices having at least three electrodes and having input circuits which include a common electrode load resistor; means for applying a comparison voltage of fixed amplitude to the input circuit of said first device; means for applying an analog voltage signal which is subject to amplitude variation to the input circuit of said second device; a source of operating supply voltage connected directly to the output electrode of said second device; a diode having its anode connected to the output electrode of said second device and its cathode connected to the output electrode of said first device, thereby to apply operating voltage to said first device by way of said diode; a source of voltage pulses; means for applying said voltage pulses across said diode in a direction tending to cut off said diode; means for so adjusting the amplitude of said applied voltage pulses that, when the analog signal applied to the input circuit of said second device is equal to the comparison voltage applied to the input circuit of said first device, the voltage drop across said diode due to said first device operating current is slightly larger than the voltage of said applied pulses at said diode, whereby said diode is maintained conducting unless said analog signal is larger than said comparison voltage; and an output circuit for said first device which includes said common electrode load resistor for developing output signals whose amplitude is a function of the amount by which the amplitude of said analog signal exceeds that of said comparison voltage.

2. A voltage comparator comprising: first and second triodes having input circuits which include a common cathode load resistor; means for applying a comparison voltage to the input circuit of said first triode; means for applying an analog voltage signal which is subject to amplitude variation to the input circuit of said second triode; a source of positive supply voltage connected to the plate of said second triode; a diode having its anode connected to the plate of said second triode and its cathode connected to the plate of said first triode, thereby to apply plate voltage to said first triode by way of said diode; a source of voltage pulses; means for applying said voltage pulses across said diode in a direction tending to cut off said diode; means for so adjusting the amplitude of said applied voltage pulses that, when the analog signal applied to the input circuit of said second triode is equal to the comparison voltage applied to the input circuit of said first triode, said applied voltage pulses are just insufficient to cut off said diode, whereby said diode is maintained conducting unless said analog signal is larger than said comparison voltage; and an output circuit for said first triode which includes said common cathode load resistor for developing output signals whose amplitude is a function of the amount by which the amplitude of said analog signal exceeds that of said comparison voltage.

3. A voltage comparator comprising: first and second triodes; a common cathode load resistor one end of which is connected to the cathode of said triodes and the other end of which is connected to a point of fixed negative potential; a comparison voltage connected to the grid of said first triode; an analog signal whose amplitude is subject to variation connected to the grid of said second triode; a source of positive supply voltage connected to the plate of said second triode; a diode having its anode connected to the plate of said second triode and its cathode connected to the plate of said first triode, thereby to apply plate voltage to said first triode by way of said diode; a source of voltage pulses; means for applying said voltage pulses across said diode in a direction tending to cut off said diode; means for so adjusting the amplitude of said applied voltage pulses that, when the analog signal connected to the grid of said second triode is equal to the comparison voltage connected to said first-triode grid, said applied voltage pulses are just insufficient to cut off said diode, whereby said diode conducts unless said analog signal is larger than said comparison voltage; and an output circuit connected across said diode for developing output signals whose amplitude is a function of the amount by which the amplitude of said analog signal exceeds that of said comparison voltage.

4. In combination; a differential amplifier comprising first and second triodes having input and output circuits and having a common cathode load resistance which is common to said input and output circuits; means for applying a comparison voltage of fixed amplitude to the input circuit of said first triode; means for applying an analog voltage which is subject to amplitude variation to the input circuit of said second triode; a source of fixed unidirectional supply voltage connected to the plate of said second triode; a diode having anode and cathode, said anode being connected to the plate of said second triode and said cathode being connected to the plate of said first triode, thereby to apply plate-supply voltage to said first triode by way of said diode; a source of voltage pulses of fixed amplitude and one polarity; means for applying said voltage pulses across said diode in a direction tending to cut off said diode, said pulses being of such amplitude that, when the comparison and analog voltages applied to the input circuits of said first and second triodes are equal, said voltage pulses are just insufficient to cut off said diode, whereby said diode conducts unless said applied analog voltage exceeds said applied comparison voltage; and means for developing in an output circuit of said amplifier voltage signals whose amplitude is a function of the amount by which the amplitude of the applied analog voltage exceeds that of the applied comparison voltage.

5. In combination; a differential amplifier comprising first and second triodes having input and output circuits and having a common cathode load resistance which is common to said input and output circuits; means for applying an analog voltage which is subject to amplitude variation to the input circuit of one of said triodes; means for applying a comparison voltage to the input circuit of the other of said triodes; a source of fixed unidirectional supply voltage connected to the plate of one of said triodes; a diode connected between the plates of said triodes, thereby to apply plate supply voltage to the other of said triodes by way of said diode; a source of voltage pulses of one polarity; means for applying said voltage pulses across said diode in a direction tending to cut off said diode, said pulses being of such amplitude that, when the analog and comparison voltages applied to the input circuits of said first and second triodes are equal, said voltage pulses are just insufficient to cut off said diode, whereby said diode conducts unless said applied analog voltage exceeds said applied comparison voltage; and means for developing in an output circuit of said amplifier voltage signals whose amplitude is a function of the difference between said analog and comparison voltages.

References Cited in the file of this patent

UNITED STATES PATENTS

| | | |
|---|---|---|
| 2,597,796 | Hindall | May 20, 1952 |
| 2,611,812 | Hornfeck | Sept. 23, 1952 |
| 2,692,975 | Levy | Oct. 26, 1954 |
| 2,695,953 | Seabury | Nov. 30, 1954 |
| 2,726,329 | Henderson | Dec. 6, 1955 |
| 2,761,972 | Fathauer | Sept. 4, 1956 |